(12) United States Patent
Sutou et al.

(10) Patent No.: US 6,517,139 B2
(45) Date of Patent: Feb. 11, 2003

(54) ASSEMBLY STRUCTURE OF AN INSTRUMENT PANEL

(75) Inventors: Mitsuru Sutou, Hamamatsu (JP); Takanori Nanba, Hamamatsu (JP)

(73) Assignee: Suzuki Motor Corporation, Shizuoka-Ken (JP)

( * ) Notice: Subject to any disclaimer, the term of this patent is extended or adjusted under 35 U.S.C. 154(b) by 0 days.

(21) Appl. No.: 10/026,738

(22) Filed: Dec. 27, 2001

(65) Prior Publication Data
US 2002/0084667 A1 Jul. 4, 2002

(30) Foreign Application Priority Data
Dec. 28, 2000 (JP) ........................................ 2000-401445

(51) Int. Cl.[7] .............................................. B62D 25/14
(52) U.S. Cl. ...................... 296/70; 296/72; 296/203.02; 180/90; 280/779; 280/752
(58) Field of Search ................................ 296/70, 37.12, 296/72, 194, 203.02, 192; 180/90; 280/752, 779; 248/27.1

(56) References Cited

U.S. PATENT DOCUMENTS

| | | | | |
|---|---|---|---|---|
| 3,784,223 A | * | 1/1974 | Hass et al. .................... 180/90 |
| 4,432,565 A | * | 2/1984 | Suzuki et al. ................. 180/90 |
| 4,682,788 A | * | 7/1987 | Yoshimura .................. 280/779 |
| 4,690,432 A | * | 9/1987 | Sakamoto et al. ............ 180/90 |
| 4,876,786 A | * | 10/1989 | Yamamoto et al. ........... 296/70 |
| 4,978,136 A | * | 12/1990 | Tomita et al. ............... 280/752 |
| 5,282,637 A | * | 2/1994 | McCreadie ............ 296/203.02 |
| 5,311,960 A | * | 5/1994 | Kukainis et al. ............. 296/70 |
| 5,387,023 A | * | 2/1995 | Deneau ........................ 296/72 |
| 5,482,319 A | * | 1/1996 | Yoshimura et al. ......... 280/752 |
| 5,564,769 A | * | 10/1996 | Deneau et al. ................ 296/72 |
| 5,676,216 A | * | 10/1997 | Palma et al. .................. 296/70 |
| 5,707,100 A | * | 1/1998 | Suyama et al. ............... 296/70 |
| 5,868,426 A | * | 2/1999 | Edwards et al. ............... 296/70 |
| 5,934,733 A | * | 8/1999 | Manwaring .................... 296/72 |
| 5,951,045 A | * | 9/1999 | Almefelt et al. .............. 180/90 |
| 6,203,092 B1 | * | 3/2001 | Yoshinaka .................... 296/70 |
| 6,213,504 B1 | * | 4/2001 | Isano et al. ................... 296/70 |
| 6,276,740 B1 | * | 8/2001 | Mellor et al. ................. 296/72 |
| 6,296,303 B1 | * | 10/2001 | Kamiya et al. ................ 296/70 |
| 6,394,527 B2 | * | 5/2002 | Ohno et al. ................... 296/70 |
| 2001/0035641 A1 | * | 11/2001 | Ohno et al. .................. 280/779 |
| 2002/0008399 A1 | * | 1/2002 | Yasuta et al. .................. 296/72 |
| 2002/0017798 A1 | * | 2/2002 | Shikata et al. ................ 296/70 |
| 2002/0056982 A1 | * | 5/2002 | Brownlee et al. ........... 280/779 |
| 2002/0105204 A1 | * | 8/2002 | Scheidel ....................... 296/70 |

FOREIGN PATENT DOCUMENTS

JP 63-159382 10/1988

* cited by examiner

Primary Examiner—Kiran Patel
(74) Attorney, Agent, or Firm—Finnegan, Henderson, Farabow, Garrett & Dunner, L.L.P.

(57) ABSTRACT

The present invention is directed to an assembly structure designed to improve the process of accurately assembling an instrument panel supported by a steering support member in a vehicle. The assembly structure includes side brackets (16), (17) arranged to mount both ends of a steering support member (15) to a car body. Side bracket (16) includes an extended portion (20) provided with an instrument panel mounting seat (22), a car body mounting seat (23), and a side trim mounting seat (24). The upper side of an instrument panel (14) is mounted to the cylindrical portion of the steering support member (15) and the lower end portion thereof is mounted to the instrument panel mounting seat (22). The car body mounting seat (23) of the side bracket (16) is mounted to the car body, while a dash side trim (31) is mounted to the side trim mounting seat (24). Instead of mounting the instrument panel (14) so as to be directly coupled to the car body, it is mounted to the car body via the steering support member (15). Since the processes of assembling the instrument panel (14) and the body panel are separated from each other, the instrument panel can be assembled accurately with an improved appearance.

11 Claims, 4 Drawing Sheets

ASSEMBLY STRUCTURE OF AN INSTRUMENT PANEL

BACKGROUND OF THE INVENTION

I. Field of the Invention

The present invention relates to the assembly structure of a car instrument panel mounted to a car body.

II. Description of the Related Art

The conventional general assembly structure of an instrument panel mounted to a car is described with reference to FIG. 8 through FIG. 10. As shown in FIG. 8, an instrument panel 1 is mounted to a car body (not shown) via a steering support member 2, extending in the direction of the width of the car, for supporting a steering column (not shown).

The steering support member 2 is coupled at the both end portions thereof to the car body via side brackets 3, 4, and the steering column is mounted to a steering bracket 5 to be thereby supported.

The instrument panel 1 is coupled at the upper side thereof to a bracket provided on the steering support member 2 by means of screws (not shown). The lower portion of the instrument panel 1 is mounted directly by means of a screw 8 to an instrument panel fixing seat 7 (see FIG. 9), which is fixed to a car-body side panel 6 of the car body. Thus, the instrument panel 1 is mounted to the car body. Incidentally, reference numeral 9 designates a glove box, reference numeral 10 designates a steering column hole, and reference numeral 11 designates a meter cluster.

In addition, as shown in FIG. 10, a dash side trim 12, mounted to both inner side portions of the car body, adjacent to the instrument panel 1 is directly mounted to the car-body side panel 6 of the car body by means of a screw 13.

The assembly structure of the conventional instrument panel, however, suffers from a number of drawbacks. For example, because the lower portion of the instrument panel 1 is directly coupled to the car-body side panel 6 of the car body, the mounting position of the instrument panel 1 varies depending on the assembly accuracy of the car body panel of the car body. This configuration causes compressive or tensile stress to act on the instrument panel 1. For this reason, strain will be produced in the instrument panel 1, resulting in uneven clearance between a component of the instrument panel 1, such as the glove box 9 or a steering column cover (not shown), and a neighboring part of the instrument panel 1, such as the dash side trim 12.

SUMMARY OF THE INVENTION

The advantages and purposes of the invention will be set forth in part in the following description, and in part will be obvious from the description, or may be learned by practice of the invention. Moreover, the advantages and purposes of the invention will be realized and attained by means of the elements and combinations particularly pointed out in the appended claims.

The present invention was developed in view of the disadvantages of the prior art. It is therefore an object of the present invention to provide the assembly structure of an instrument panel, which alleviates variations in assembly accuracy of the instrument panel and thereby provides improved appearance.

To solve the aforementioned problems, the instrument panel assembly structure according to the invention includes an instrument panel having an upper portion coupled to a steering support member arranged to extend parallel to the instrument panel and support a steering panel; a side bracket arranged to mount an end portion of the steering support member to a car body, and having an extended portion extending away from the steering support member; a first mounting portion supported by the extended portion of the side bracket, and coupled to a lower portion of the instrument panel; and a second mounting panel supported by the extended portion of the side bracket and coupled to the car body.

In the structure adapted as described above, the instrument panel is mounted to the car body via the steering support member but not coupled directly to the car body, thereby making it possible to improve the assembly accuracy of the instrument panel without being affected by variations in assembly accuracy of the body panel of the car body.

The instrument panel assembly structure according to the invention further includes a separate cover arranged to cover a surface of a coupling portion of the first mounting portion. This makes it possible to provide to improve the appearance of the instrument panel assembly, and allows the coupling portion to be placed at the front of the instrument panel.

The instrument panel assembly structure according to the invention further includes a cover that is located near a glove box of the instrument panel. This configuration allows the parting of the lines of the glovebox and the cover to be flush with each other.

The instrument panel assembly structure according to the present invention further includes a cover and a glove box that display a common color different from the color of the instrument panel. This configuration allows the instrument panel to be provided with two levels of halftone color.

The instrument panel assembly structure according to the present invention also includes a glove box having a surface configured to cover a surface of the coupling portion of the first mounting portion of the instrument panel. This configuration allows the surface of a coupling portion of the first mounting portion of the instrument panel to be covered with a cover portion. It is thus possible to further improve the appearance of the instrument panel, and place the coupling portion at the front of the instrument panel. Furthermore, the design surface of the glove box is extended to form a cover portion, thereby obviating the need for a separate cover.

The instrument panel assembly structure according to the present invention yet further includes a first mounting portion that includes a coupling portion provided on a side portion of the instrument panel. This arrangement allows the surface of the coupling portion of the first mounting portion of the instrument panel to be hidden behind the side portion of the instrument panel, thereby obviating the need for a cover for covering the coupling portion.

The instrument panel assembly structure according to the present invention also includes a third mounting portion arranged on the extended portion of the side bracket, and coupled to a dash side trim so as to cover both side portions of an inside portion of the car body. This configuration allows the first mounting portion and the third mounting portion, provided on the common side bracket, to be coupled with the instrument panel and dash side trim, respectively. This makes it possible to improve the positioning accuracy between the instrument panel and the dash side trim irrespective of the assembly accuracy of the body panel.

As described above, the instrument panel assembly structure according to the invention set forth in the appended claims is adapted such that the instrument panel is mounted to the car body via the steering support member, but not coupled directly to the car body. As a result, it is possible to improve the assembly accuracy of the instrument panel irrespective of the assembly accuracy of the body panel of the car body. Moreover, the strain caused by assembly can be alleviated and clearances between the instrument panel and other parts can be made uniform, thereby making it possible to provide improved appearance.

In addition to the effects of the present invention include improving the appearance of the instrument panel assembly since the surface of the coupling portion of the first mounting portion of the instrument panel is covered with a cover. Furthermore, a coupling portion can be placed at the front of the instrument panel, thereby making it possible to improve the process of assembling the instrument panel itself.

Additionally, the present invention allows the parting lines of the glove box and the cover to be flush with each other, thereby making it possible to still further improve the appearance of the instrument panel assembly.

It is to be understood that both the foregoing general description and the following detailed description are only exemplary, and are intended to provide further explanation of the invention as claimed.

BRIEF DESCRIPTION OF THE DRAWINGS

The accompanying drawings are included to provide a further understanding of the invention and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Reference will now be made in detail to the present preferred embodiments of the invention illustrated in the accompanying drawings. Wherever possible, the same reference numbers are used throughout the drawings to refer to the same or like parts. Generally, the embodiments of the present invention illustrate a right steering wheel car.

Figure 1:
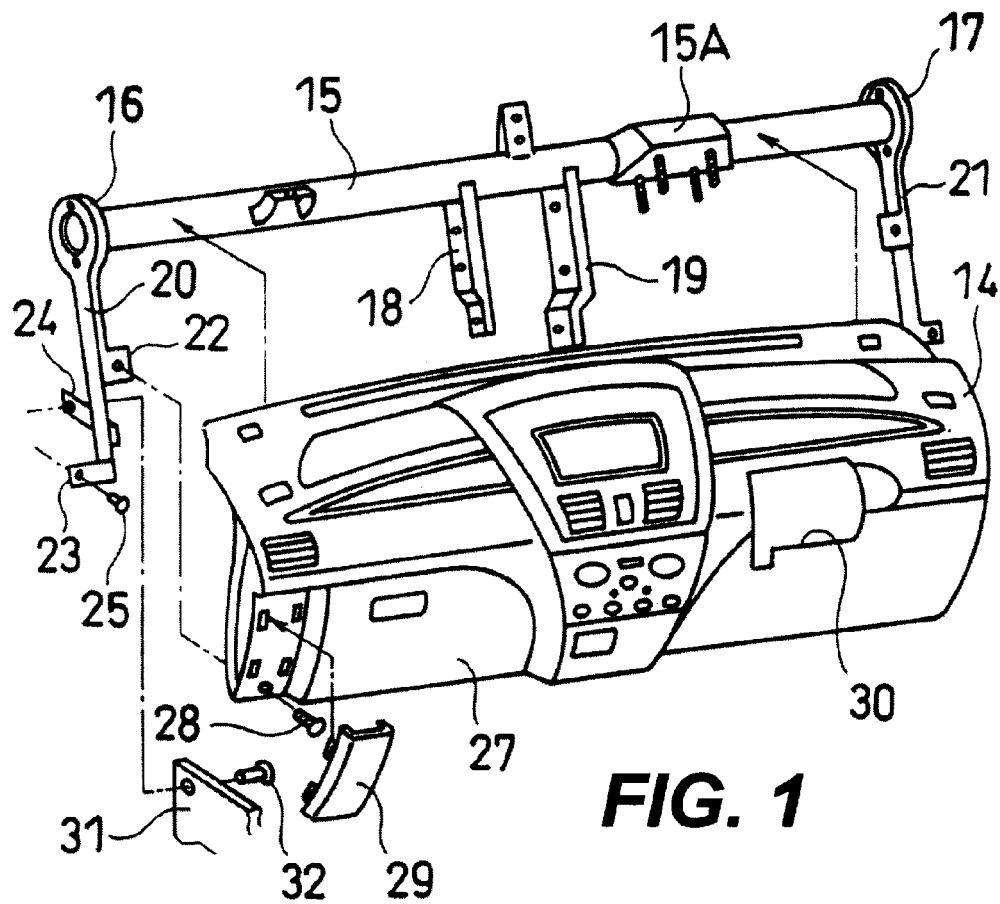
FIG. 1 is an exploded perspective view showing the assembly structure of an instrument panel according to a first embodiment of the present invention.

A first embodiment of the present invention is described below with reference to FIGS. 1 through 4. As shown in FIG. 1, an instrument panel 14 is mounted to a steering support member 15 that is disposed behind a dash panel (not shown) of the car body.

The steering support member 15 is a cylindrical member extending in the direction of car width, with both end portions being mounted to the car body with bolts (not shown) or the like by means of side brackets 16, 17. The central portion of the steering support member 15 is supported by means of stays 18, 19 on the car body. Moreover, a steering column (not shown) is attached to a bracket 15A provided on the right side to support the steering support member 15.

The side brackets 16, 17 are provided integrally with extended portions 20, 21 each extending along a downward direction substantially perpendicular to the axis of the steering support member 15. Incidentally, since the right and left side brackets 16, 17 are symmetric and generally similar to each other, only those portions related to the left side bracket 16 are described.

Figure 2:
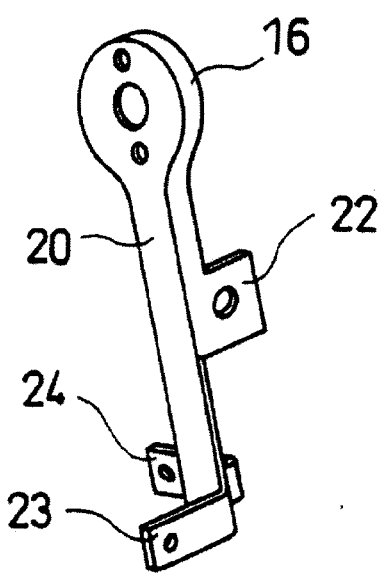
FIG. 2 is an enlarged perspective view showing the left side bracket illustrated in FIG. 1.
Figure 3:
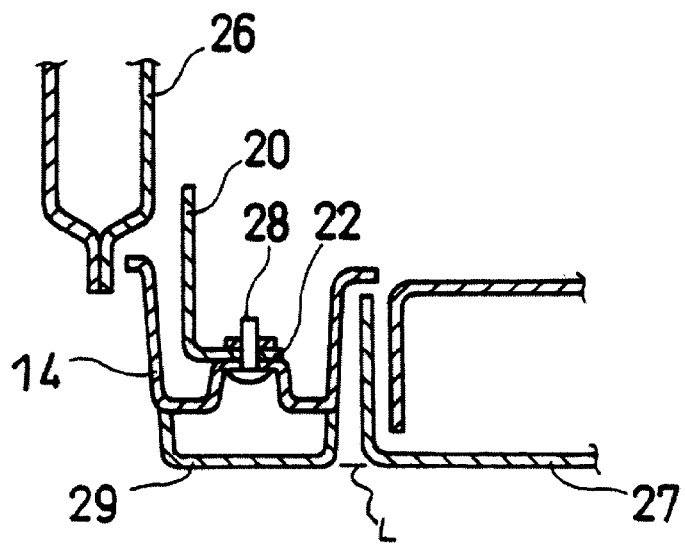
FIG. 3 is an enlarged cross-sectional view showing the coupling portion between the lower portion and side bracket of the instrument panel of the structure shown in FIG. 1.
Figure 4:
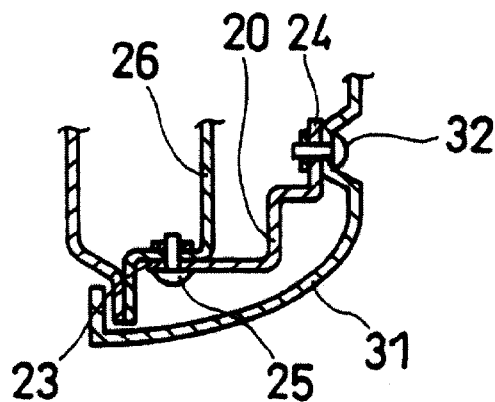
FIG. 4 is a cross-sectional view showing the coupling portions between the side bracket having the structure shown in FIG. 1 and the body panel, and the dash side trim.

As shown in FIG. 2, at the intermediate portion of the extended portion 20 of the side bracket 16, provided is an instrument panel mounting seat 22, alternatively referred to as a "first mounting portion," which is oriented in the forward and backward direction of the car body to oppose the lower portion of the instrument panel 14. In addition, a car body mounting seat 23, alternatively referred to as a "second mounting portion," is provided at the end portion of the extended portion 20, and is oriented in the forward and backward direction of the car body. Moreover, a side trim mounting seat 24, alternatively referred to as a "third mounting portion," is provided on the extended portion 20, and is oriented in the direction of the width of the car body. The car body mounting seat 23 is coupled to a body side panel 26 (see FIG. 4) of the car body by means of a screw 25.

The instrument panel 14 is mounted to cover the steering support member 15, with the upper side thereof being bolted (not shown) to a bracket provided on the steering support member 15. In addition, a glove box 27 located at the lower end portion of the instrument panel 14 is mounted, on the outer portion of the instrument panel 14 in the direction of the width of the car body, with a screw 28 to the instrument panel mounting seat 22 provided on the extended portion 20 of the side bracket 16.

On the outer portion of the glove box 27 in the direction of the width of the car body, there is provided a design surface flush with the design surface (front cover surface) of the glove box 27. There is also provided a side cover 29 having an upper parting line L that is common to the glove box 27 to cover the head portion of the screw 28 (see FIG. 3). Reference numeral 30 designates a steering column hole in FIG. 1.

A dash side trim 31, disposed near a side portion of the instrument panel 14, which is mounted to both ends of the inside of the car body, for covering the body side panel 26 is mounted by means of a screw 32 to the side trim mounting seat 24 provided on the extended portion 20 of the side bracket 16.

Now, the operation of the illustrated embodiment of the invention will be described.

The instrument panel 14 is coupled at the upper side thereof to the cylindrical portion of the steering support member 15 and is coupled at the lower end portion to the instrument panel mounting seat 22 provided on the extended portion 20 of the side bracket 16. Thus, the instrument panel 14 is mounted to the car body via the steering support member 15, but not coupled directly to the body panel, thereby making it possible to improve the assembly accuracy of the instrument panel without being affected by variations in assembly accuracy of the body panel. Consequently, it is possible to reduce the compressive and tensile stress caused by the attachment of the instrument panel 14, and thereby prevent the occurrence of strain in the instrument panel 14. In addition, it is possible to provide uniform clearance between the instrument panel 14 and the components of the instrument panel 14, such as the glove box 27 or a steering column cover (not shown), and thereby provide improved appearance.

In addition, the dash side trim 31 is coupled to the side trim mounting seat 24 of the extended portion 20 of the side bracket 16, which is a mounting member common to the instrument panel 14. This makes it possible to improve the positioning accuracy between the instrument panel 14 and the dash side trim 31 irrespective of the assembly accuracy of the body panel and provide uniform clearance therebetween, thereby providing improved appearance.

Here, the instrument panel mounting seat and the dash side trim mounting seat, which are conventionally provided on the body side, are integrally provided on the extended portion 20 of the side bracket 16, thereby making it possible to improve productivity and reduce assembly costs.

Furthermore, since the side cover 29 for covering the screw 28 and the upper parting line L of the glove box 27 are made flush with each other, the glove box 27 and the side cover 29 can be molded with synthetic resins or the like of a common color. Thus, this makes it possible to distinguish the color thereof from those of other parts of the instrument panel 14, providing two levels of halftone color easily to the instrument panel 14 without painting and thus providing increased degrees of freedom in design.

Now, a second embodiment of the present invention is described with reference to FIG. 5. Incidentally, the same components as those of the first embodiment are given the same reference numerals, and only those different from the first embodiment are explained in detail below.

Figure 5:
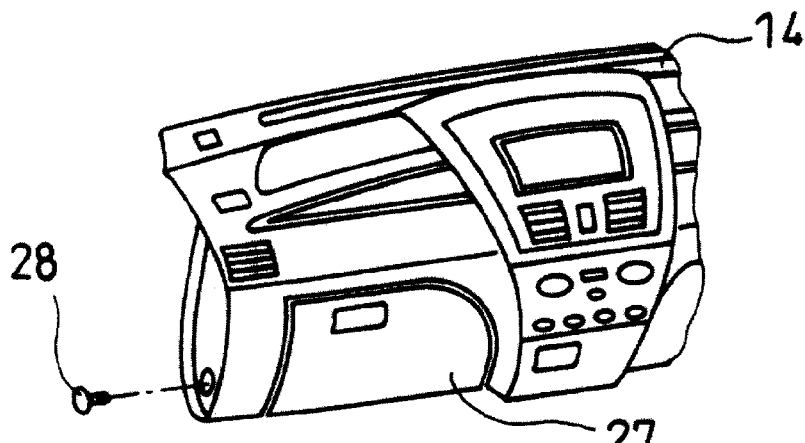
FIG. 5 is an exploded perspective view showing the assembly structure of an instrument panel according to a second embodiment of the present invention.

As shown in FIG. 5, in the assembly structure of an instrument panel according to the second embodiment, the instrument panel mounting seat 22 of the extended portion 20 of the side bracket 16 is placed opposite to the side wall of the end portion of the instrument panel 14 in the direction of the width of the car. Then, the screw 28 is inserted from a side of the instrument panel 14 to mount and thereby fix the instrument panel 14 onto the instrument panel mounting seat 22.

With the structure adapted as described above, the head of the screw 28 is covered by a door of the car body (not shown) or the like, obviating the need for a side cover to cover the head of the screw 28. Thus, this makes it possible to reduce the number of parts to thereby reduce assembly costs.

Now, a third embodiment of the present invention is described below with reference to FIGS. 6 and 7. Incidentally, the same components as those of the first embodiment are given the same reference numerals, and only those different from the first embodiment are explained in detail below.

Figure 6:
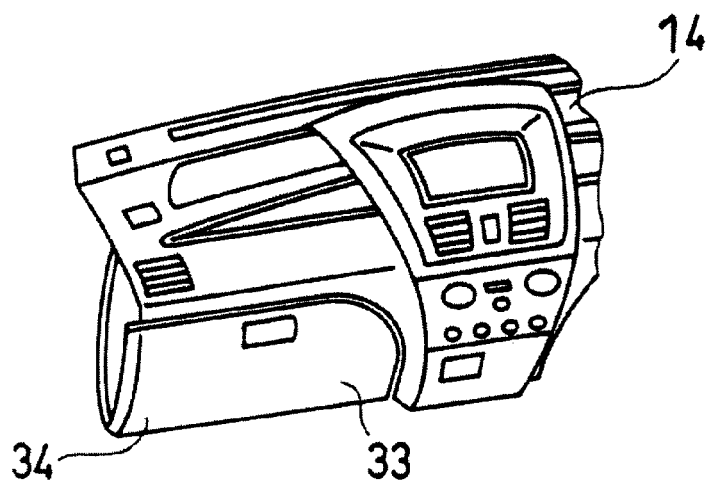
FIG. 6 is a perspective view showing an instrument panel according to a third embodiment of the present invention.
Figure 7:
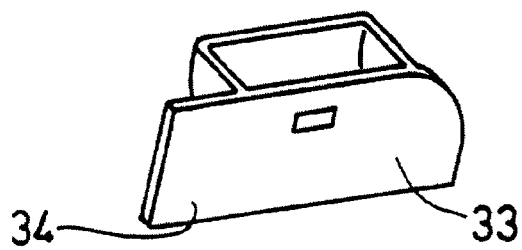
FIG. 7 is a perspective view showing the glove box of the instrument panel shown in FIG. 6.
Figure 8:
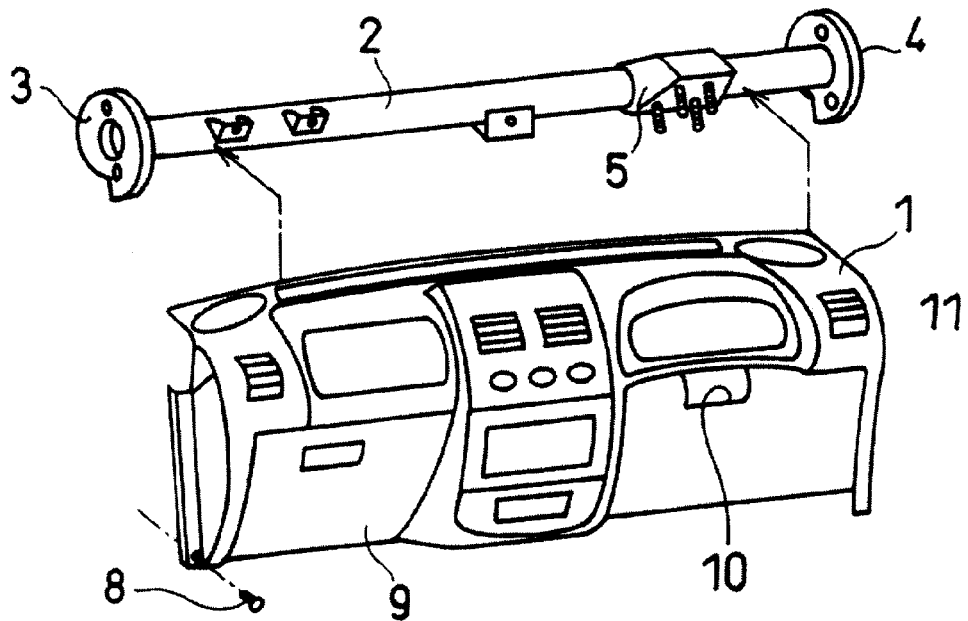
FIG. 8 is an exploded perspective view showing the assembly structure of a conventional instrument panel.
Figure 9:
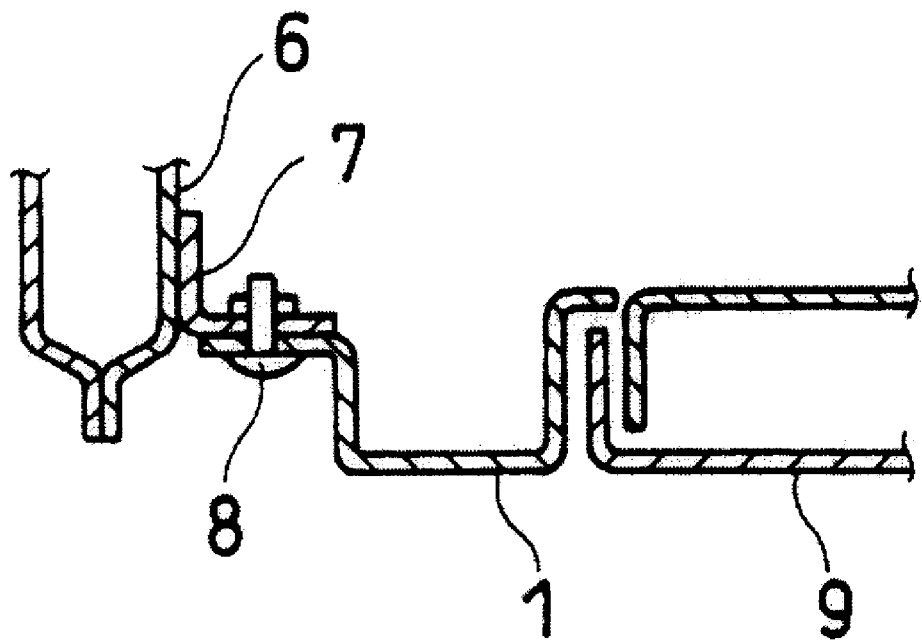
FIG. 9 is an enlarged cross-sectional view showing the coupling portion between the lower portion of the instrument panel having the structure shown in FIG. 8 and the body panel of the car body.
Figure 10:
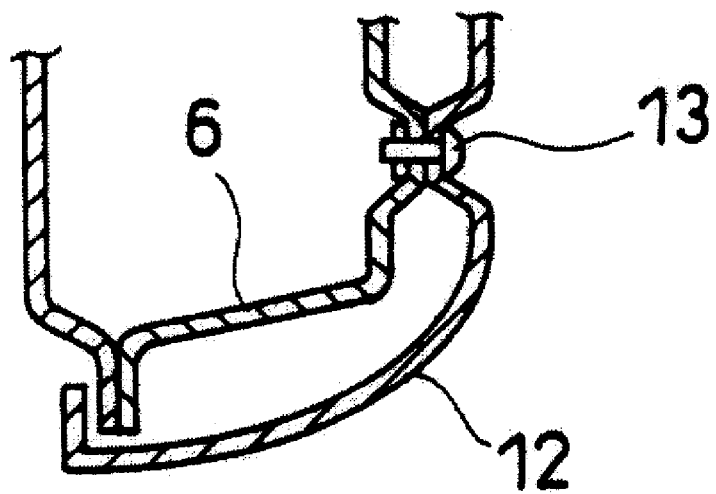
FIG. 10 is a cross-sectional view showing the coupling portion between the body panel of the car body having the structure shown in FIG. 8 and the dash side trim.

As shown in FIGS. 6 and 7, in the assembly structure of an instrument panel according to the third embodiment, the design surface (front cover surface) of a glove box 33 is extended towards the end portion in the direction of the width of the car. Then, the side cover portion 34, which covers the surface of the portion to be coupled to the instrument panel mounting seat 22 of the instrument panel 14, is integrated with the glove box 33.

With the structure adapted as described above, the head of the screw 28 for mounting the instrument panel 14 onto the instrument panel mounting seat 22 can be covered with the cover portion 34 of the glove box 33, thereby obviating the need for a separate side cover. It is thus possible to reduce the number of parts to thereby reduce assembly costs.

Other embodiments of the invention will be apparent to those skilled in the art from consideration of the specification and practice of the invention disclosed herein. It is intended that the specification and examples be considered as exemplary only. Thus, it should be understood that the invention is not limited to the illustrative examples in this specification. Rather, the invention is intended to cover all modifications and variations that come within the scope of the following claims and their equivalents.

What is claimed is:

1. An instrument panel assembly structure comprising:

an instrument panel having an upper portion coupled to a steering support member arranged to extend parallel to the instrument panel and support a steering column;

a side bracket arranged to mount an end portion of the steering support member to a car body, and having an extended portion extending away from the steering support member;

a first mounting portion supported by the extended portion of the side bracket, and coupled to a lower portion of the instrument panel; and a second mounting portion supported by the extended portion of the side bracket and coupled to the car body.

2. The instrument panel assembly structure of claim 1, further comprising a separate cover arranged to cover a surface of a coupling portion of the first mounting portion.

3. The instrument panel assembly structure of claim 2, wherein the cover is located near a glove box of the instrument panel.

4. The instrument panel assembly structure of claim 2, wherein the cover is arranged such that an upper parting line of the cover is aligned with an exterior surface of the glove box.

5. The instrument panel assembly structure of claim 3, wherein the cover and the glove box display a first color, and other portions of the instrument panel display a second color.

6. The instrument panel assembly structure of claim 1, further comprising a glove box having a covering surface configured to cover a surface of a coupling portion of the first mounting portion of the instrument panel.

7. The instrument panel assembly structure of claim 6, wherein the covering surface comprises a side cover portion protruding from the glove box.

8. The instrument panel assembly structure of claim 1, wherein the first mounting portion includes a coupling portion provided on a side portion of the instrument panel.

9. The instrument panel assembly structure of claim 1, further comprising a third mounting portion arranged on the extended portion of the side bracket, and coupled to a dash side trim so as to cover both side portions of an inside portion of the car body.

10. The instrument panel assembly structure of claim 5, further comprising a third mounting portion arranged on the extended portion of the side bracket, and coupled to a dash side trim so as to cover both side portions of an inside portion of the car body.

11. The instrument panel assembly structure of claim 6, further comprising a third mounting portion arranged on the extended portion of the side bracket, and coupled to a dash side trim so as to cover both side portions of an inside portion of the car body.

* * * * *